United States Patent [19]

Imhof

[11] Patent Number: 5,069,258
[45] Date of Patent: Dec. 3, 1991

[54] DEVICE FOR THE VIBRATION FILLING OF POROUS PLAQUES FOR VOLTAIC CELLS

[75] Inventor: Otwin Imhof, Nürtingen, Fed. Rep. of Germany

[73] Assignee: Deutsche Automobilgesellschaft mbH, Fed. Rep. of Germany

[21] Appl. No.: 604,337

[22] Filed: Oct. 26, 1990

Related U.S. Application Data

[63] Continuation-in-part of Ser. No. 373,407, Jun. 30, 1989, abandoned.

[30] Foreign Application Priority Data

Jul. 1, 1988 [DE] Fed. Rep. of Germany ....... 3822209

[51] Int. Cl.⁵ ............................................. H01M 4/72
[52] U.S. Cl. ..................................... 141/1.1; 141/32; 141/75; 366/117; 29/2; 29/623.5
[58] Field of Search ................... 366/116-123, 366/108; 222/196, 197, 200, 201; 141/1.1, 32, 71-75, 80, 240; 29/2, 623.1, 623.5; 429/233, 225

[56] References Cited

U.S. PATENT DOCUMENTS

| | | | |
|---|---|---|---|
| 1,318,740 | 10/1919 | Fessenden | 366/118 |
| 1,894,812 | 1/1933 | Wuest | 141/32 |
| 2,520,833 | 8/1950 | Connolly et al. | 366/123 |
| 2,592,703 | 4/1952 | Jaffe | 366/108 X |
| 3,449,163 | 6/1969 | Mobius et al. | 366/108 X |
| 3,680,841 | 8/1972 | Yagi et al. | 366/118 |
| 3,841,362 | 10/1974 | Haller et al. | 141/32 |
| 3,859,135 | 1/1975 | Roberts et al. | 141/1.1 |
| 4,076,058 | 2/1978 | Culpin et al. | 141/1.1 |
| 4,217,939 | 8/1980 | Yanagihara et al. | 141/1.1 |
| 4,429,442 | 2/1984 | Thomas | 29/2 |
| 4,664,990 | 5/1987 | Clark et al. | 29/623.1 X |
| 4,974,644 | 12/1990 | von Benda et al. | 141/1.1 |

FOREIGN PATENT DOCUMENTS

| | | |
|---|---|---|
| 1210417 | 8/1966 | Fed. Rep. of Germany . |
| 1287663 | 1/1969 | Fed. Rep. of Germany . |
| 0571808 | 1/1958 | Italy ................... 366/108 |
| 55-13963 | 10/1980 | Japan . |
| 62-24559 | 2/1987 | Japan . |
| 491512 | 7/1970 | Switzerland . |

Primary Examiner—Henry J. Recla
Assistant Examiner—Casey Jacyna
Attorney, Agent, or Firm—Evenson, Wands, Edwards, Lenahan & McKeown

[57] ABSTRACT

A simple device for the vibration filling of porous fiber structure electrode plaques for voltaic cells includes a vibrating plate having a principal extension arranged substantially vertical within a filling chamber. An electrode plaque is arranged with a principal surface substantially parallel to the principal surface of the vibrating plate at a distance of about 2 to 50 mm from the vibrating plate (when swung in to the maximum extent). The distance of the vibrating plate from the base of the filling chamber is at least about 1 mm. It is possible to fill a series of electrode plaques with one charge of the filling chamber, the filling operation for the electrode plaque proceeding very rapidly and with considerably less noise than known devices, in which the entire filling vessel is vibrated.

1 Claim, 1 Drawing Sheet

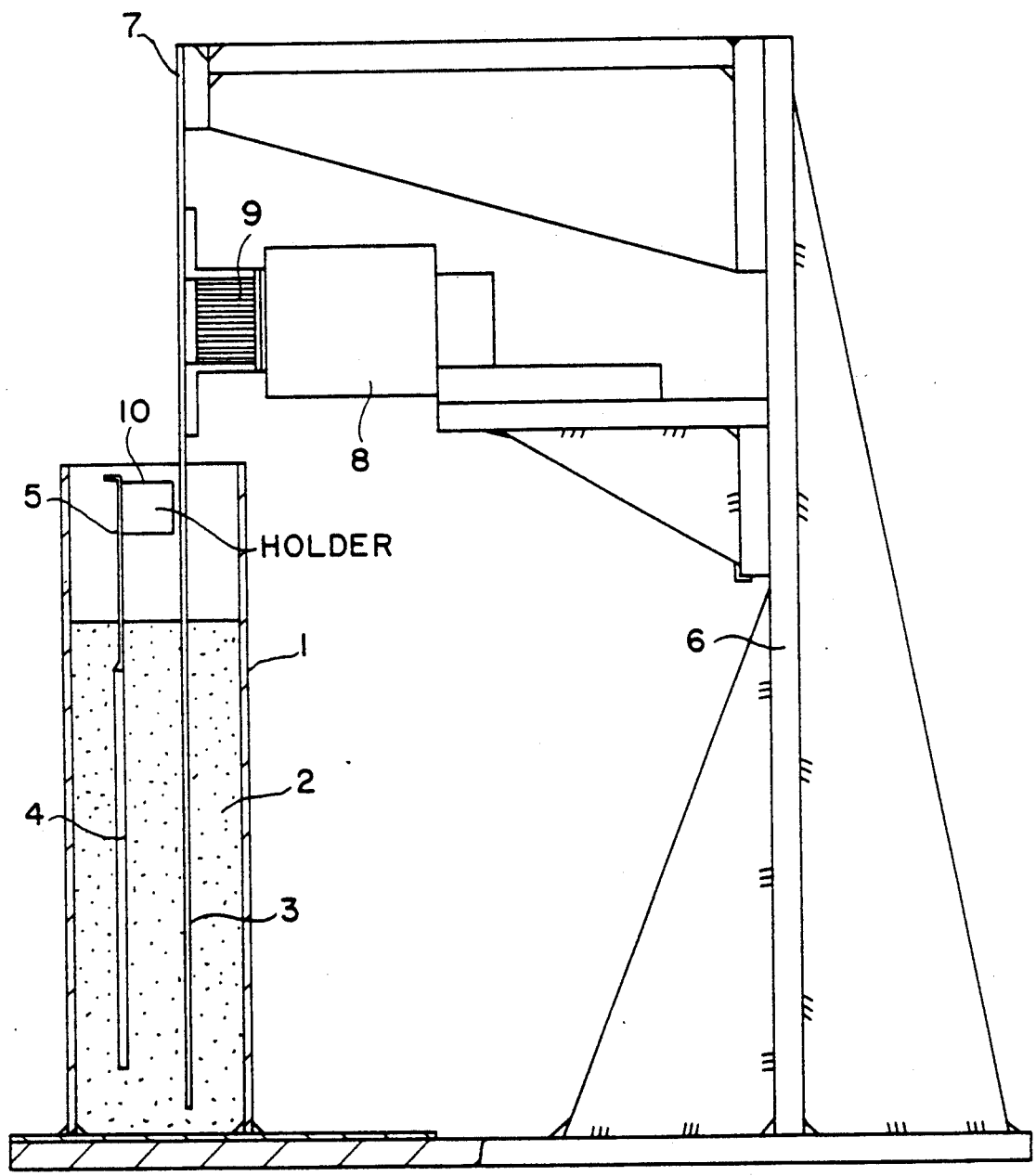

DEVICE FOR THE VIBRATION FILLING OF POROUS PLAQUES FOR VOLTAIC CELLS

BACKGROUND AND SUMMARY OF THE INVENTION

This is a Continuation-in-Part of application Ser. No. 07/373,407, filed on June 30, 1989 by Otwin Imhof now abandoned, claiming priority of German Priority Document P 38 22 209.4, filed on July 1, 1988 in the Federal Republic of Germany.

The present invention generally relates to a device for the vibration filling of porous electrode plaques for voltaic cells, with an active compound and more particularly, to such a vibration device which is capable of vibrating a large quantity of active substance with relatively little noise.

Electrodes for voltaic cells can be produced by filling a porous electrode plaque, e.g. a plastics foam or a fiber structure plaque, with fine grained active filling materials as, the active compound. In order to facilitate and complete the penetration of the active compound into the pores, mechanical or physical aids such as shakers, vibrators, ultrasound and the like are used.

Thus, for example, a vibration filling device for electrode plaques is disclosed by German Published, Examined Patent Application (DE-AS) 1,287,663, the device comprising a trough-shaped filling chamber whose base is formed by a vibrating plate. Into this filling chamber is introduced a layer of the active compound in paste form, the porous electrode plaque being placed parallel to the vibrating plate and covered with a further layer of the active compound. The result is that the electrode plaque is completely surrounded by active compound inside the filling chamber. The active compound is then vibrated into the pores of the electrode plaque by the action of ultrasonic vibrations.

The particular disadvantage of this device is that the entire filling vessel has to be vibrated, since the base of the filling vessel is formed by the vibrating plate. Such a filling device is only suitable for relatively small electrode plaques since, in the case of large plaques, the filling chamber and the masses to be accelerated become too large and the device not only becomes uneconomical but symptoms of material fatigue, such as cracks and the like, may occur at the walls of the filling chamber.

An object of the present invention is to provide a device for vibration filling of porous electrode plaques which is simple and economical to produce, is mechanically robust and uncomplicated and can fill large electrode plaques simply.

An important feature of preferred embodiments of the device is that the vibrating plate with its principal extension is arranged vertical and is situated inside the filling chamber. As a result, it is no longer necessary to vibrate the entire filling vessel but only the active compound situated inside the filling vessel to the extent that this is necessary for filling the electrode plaque. For filling, the electrode plaque to be filled is arranged substantially parallel to the vibrating plate at a distance of about 2 to 50 mm, a distance in the range of about 5 to 15 mm being preferred. In this context, this distance of course relates to the position of the vibrating plate at which the vibrating plate is swung out to the maximum extent towards the fiber plaque. If the distance is less than this, there is the risk that the vibrating plate will touch and damage the fiber plaque as it vibrates, while, if the maximum distance is exceeded, the energy requirement rises very sharply with a simultaneous decrease in effect.

In general, it can be stated that the optimum distance between vibrating plate and electrode plaque is also dependent on the thickness of the electrode plaque. Thus, in the case of thin electrode plaques, smaller distances from the vibrating plate will be chosen than in the case of thick electrode plaques.

The distance of the vibrating plate from the wall of the filling chamber should be selected such that, at a maximum amplitude of vibration, the vibrating plate cannot touch the wall of the filling vessel. Furthermore, there should be an additional distance so that the active compound in the intermediate space between vibrating plate and wall does not splash, since this would lead to unnecessary energy consumption. Of course, a certain distance between the base of the filling vessel and the vibrating plate is also necessary and this distance should be at least about 1 mm. If there are relatively large particles in the active compound or the formation of such relatively large particles is to be expected, the minimum distances of the lower edge of the vibrating plate from the base of the filling chamber must be correspondingly increased.

The dimension of the vibrating plate or of the immersed part of the vibrating plate should, with a range of variation of about 20%, correspond approximately to the dimensions of the electrode plaque to be filled. During the filling of the electrode plaque, the entirety of the paste in the space between the electrode plaque and the vibrating plate is thereby simultaneously set in controlled motion and uniform and rapid filling takes place. Of course, it is also possible for a plurality of electrode plaques suspended next to one another in the paste to be filled simultaneously, using a correspondingly enlarged vibrating plate. An enlargement of the vibrating plate dimensions by more than 20% relative to the electrode plaques to be filled does not produce any further improvement during filling but increases the energy consumption. If the vibrating plate dimensions are more than about 20% less than the dimensions of the electrode to be filled, the filling takes noticeably longer and, if the vibrating plate becomes very small, nonuniform and incomplete filling of the electrode plaque may occur.

The vibrating plate can be driven in a very wide variety of ways, which are well-known to the person skilled in the art, e.g. by means of an unbalance motor or by means of an electric vibrator operating electromagnetically or piezoelectrically etc. The manner of driving the vibrating plate depends on the size of the vibrating plate to be moved and also on the frequency at which the vibrating plate is operated. For filling fiber structure electrode plaques, a frequency of oscillation of about 30 Hz to 100 Hz at which the vibrating plate is moved towards and away from the fiber plaque has, for example, proved expedient. At the same time, it is advantageous if the acceleration of the vibrating plate is set such that waves form at designated locations on the surface of the paste in the filling chamber.

Other objects, advantages and novel features of the present invention will become apparent from the following detailed description of the invention when considered in conjunction with the accompanying drawings.

BRIEF DESCRIPTION OF THE DRAWINGS

The single FIGURE illustrates a side, sectional view of one embodiment of the device for vibration filling of porous electrode plaques in accordance with the present invention.

DETAILED DESCRIPTION OF THE DRAWING

In the single FIGURE, a device for filling porous electrode plaques is shown diagrammatically. A vibrating plate 3 extends into a firmly clamped vessel 1 which is filled with a suspension 2 of the active compound. The electrode plaque 4 to be filled, which is held in the suspension 2 via a current discharge lug 5 by means of a holding device (not illustrated), is situated opposite the vibrating plate 3 in the suspension. The vibrating plate 3 is secured by its upper end 7 on a frame 6, which also carries an vibratory armature motor 8. The vibrating plate 3 is driven via the armature 9 of the vibratory armature motor 8, the elasticity of the vibrating plate 3 permitting oscillatory movement towards and away from the electrode plaque 4.

Instead of the rigid clamping of the vibrating plate at its upper end 7, it would of course also be possible to clamp it elastically there via rubber buffers It is also possible to omit the clamping completely and to secure the vibrating plate 3 solely on the armature 9 if the latter has an appropriate guide. It is also not absolutely necessary to drive the vibrating plate 3 from the above vessel, e.g. it is also conceivable to drive the vibrating plate by means of a ram guided through the side wall of the container 1. Admittedly, for such a solution, a passage through the wall of the container 1 is required, and this is associated with a certain expenditure and can also give rise to sealing problems. The vibrating plate or plates 3 used in the device can have, for example, dimensions in the order of 100 to 650 mm in length and of 50 to 200 mm in width. The vibrating plate 3 is arranged vertically in the impregnating vessel 1. The vibrating plate 3 is arranged in parallel to the fiber structure electrode plaque 4 at a distance of, for example, from 2 to 50 mm. The distance of the vibrating plate 3 to the bottom of the impregnating vessel may be approximately 1 to 25 mm. The distance of the vibrating plate 3 from the back wall of the filling chamber 1 is, for example, between 3 and 20 mm.

The frequency of the vibrating plate 3 is set in a range of 30 Hz to 100 Hz. The amplitude range of the vibrating plate 3 can be, for example, between 0.2 and 1.6 mm. The surface area of the vibrating plate 3 immersed into the paste 2, with a fluctuation range of ±20%, corresponds to the surface of the immersed electrode plaque 4.

The fiber structure electrode plaque 4 used in the device can be, for example, a nonwoven or needle felt web, having a thickness on the order of 0.25 to 8 mm and a mean pore diameter on the order of 70 to 90 $\mu$m. Prior to impregnating the plaques 4, the plaques 4 have a porosity of from 50 to 98%, with a weight per unit area of the web of from 50 to 800 g/m$^2$. The synthetic fibers of the plaques 4 have, for example, a diameter of from 0.4 to 7.4 dtex, with a fiber length of from 15 to 80 mm.

The synthetic fibers of the plaques 4 were activated, chemically metallized and galvanically reinforced by means of a metal layer, such that the electrode plaque 4 has a nickel coating of from 25 to 300 mg Ni/cm$^2$.

The electrode plaque 4 is filled with a viscous paste suspension 2 which can, for example, have as the main constituent, a content of 28 to 55 percent by volume of nickel hydroxide (Ni(OH)$_2$). The nickel hydroxide has a flow range on the order of 20 to 140 Pa and a plastic viscosity of from 0.05 to 1.4 Pas. Alternately, in another embodiment, the electrode plaque 4 may also be filled with a viscous paste suspension 2 which has a content of 15 to 35 percent by volume of cadmium oxide (CdO), and in addition 7 percent by volume of cadmium or 1 percent by volume of nickel hydroxide. This suspension 2 has a flow range of from 5 to 250 Pa, and a plastic viscosity of from 0.05 to 3.5 Pas. The suspension plate mixture 2 also contains dispergators.

The time period necessary for a sufficient filling of the electrode plaques 4 with the paste 2 is approximately between 10 and 60 seconds. In the following, two experimental examples will be described:

EXAMPLE I

A suspension paste formulation consisting of 39 percent by volume or 68.4 percent by mass of Ni(OH)$_2$; 0.5 percent by volume or 2.1 percent by mass of cobalt powder; and 60 percent by volume or 27.8 percent by mass of a 0.2 M Co $K_{K1.5}H_{0.5}$ hydroxyethane disphosphonic acid (HEDP) dispersing solution were mixed and ground in a ball mill having a capacity of 70 l with 21 kg grinding balls having a diameter of 20 mm and 21 kg grinding balls having a diameter of 40 mm. The paste was mixed and ground at 50 rotations/min. for 20 hours. After being separated from the grinding balls, approximately 50 kg of the viscous paste 2 were obtained with a liquid limit of 50 Pa and a plastic viscosity of 0.4 Pas. A portion of this paste 2 was transferred to an impregnating vessel 1 into which a vibrating plate 3 projects. A distance of 10 mm existed between the vibrating plate 3 and the bottom of the vessel. Between the wall of the filling chamber and the vibrating plate 3, the distance is 10 mm. At a distance of 8 mm from the vibrating plate 3, the electrode plaques 4 are immersed successively, the vibrating energy being adjusted such that no splashing of the paste occurred at the surface. The frequency of the vibrating plate 3 was determined to be 55 Hz, and the amplitude to be 0.8 mm. The surface area of the vibrating plate 3 which is immersed in the suspension paste has a width of 200 mm and a height of 250 mm. The fiber structure electrode plaques 4 to be filled, have a coating of 150 mg Ni/cm$^2$ and a thickness of 2.5 mm, and are 180 mm wide and 160 mm high. The fiber structure electrode plaque held at the current conducting vane has a porosity of 86%. After having been immersed into the suspension paste 2 for 30 seconds, the electrode plaque 4 was removed from the paste. The excess paste adhering to the plaque's surface was cleaned off and the plaque was dried at 100° C. From the masses of the empty and the filled electrode plaque (filling moist and filling dry), a filling of the pore volume of 98.5% is obtained and a filling of dry active mass of 1.2 g/cm$^3$ is obtained related to the total volume.

EXAMPLE 2

A filling chamber into which a vibrating plate 3 projects is filled with a viscous CdO-paste 2 with a liquid limit of 36 Pa and a plastic viscosity of 0.4 Pas. The immersed surface of the vibrating plate 3 is 120 mm wide and 130 mm high. The distance of the vibrating plate 3 from the electrode plaque on one side and to the wall of the filling chamber on the other side is 5 mm.

The adjusted frequency of the vibrating plate 3 is 60 Hz and the amplitude is 0.7 mm. A fiber structure electrode plaque 4 formed of a PP needle felt needled on both sides having a weight per unit area of 80 g/m$^2$ as well as a nominal thickness of 1 mm is immersed in front of the vibrating plate 3. The size of the active surface is 110 mm (width) and 116 mm (height), with a nickel coating of 50 mg Ni/cm$^2$. The plaque 4 thickness is 0.5 mm. A current conducting vane made of nickel sheet with a height of 20 mm and a thickness of 0.2 mm is spot-welded to a vane projection at a height of 5 mm. The immersed plaque in the paste is arranged in parallel to the vibrating plate. After a dwell time of 40 seconds, the plaque is pulled out of the paste and the excess paste is cleaned of the surface of the plaque. By means of weighing and calculating, a filling of moist active mass of 14.4 g is obtained, and after the drying at 100° C., a filling of dried active mass of 11.6 g is obtained. The average value of 50 evaluated impregnated fiber structure electrodes for the solid mass proportion of the paste in the plaques amounts to 79.5%. The weighing of the difference continues to result in an almost complete filling of the frame, i.e., over 98% of the hollow space volume with active moist mass.

The advantages achievable with preferred embodiments of the present invention lie particularly in fact that even large electrode plaques can be filled in a simple manner and very rapidly, that a relatively large quantity of suspension of the active compound can be present in the container or is fed in continuously so that the suspension does not have to be renewed after each filled electrode plaque and that, in particular, the generation of noise compared to those filling devices in which the entire container vibrates is very considerably reduced.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A method for vibration filling a porous fiber structure electrode plaque, having a mean pore diameter of approximately 70 to 90 μm and being available in thick and thin sizes, for voltaic cells, the method comprising the steps of:
   immersing the porous fiber structure electrode plaque in a filling chamber means containing an active compound comprising a viscous paste, the filling chamber means having a base;
   immersing a vibrating plate means in the filling chamber means;
   arranging said vibrating plate means to have a principal vertical surface at an angle of 90° with respect to the base within the filling chamber means;
   holding the porous fiber structure electrode plaque substantially parallel to the principal surface of the vibrating plate means and independently from the vibrating plate means;
   spacing said vibrating plate means about 2 to 50 mm from a position of the porous fiber structure electrode plaque, wherein a greater spacing applies to thick electrode plaques and a lesser spacing applies to thin electrode plaques,
   spacing said vibrating plate means a distance from the base of the filling chamber means of at least 1 mm wherein if large particles are present in the active compound said distance of at least 1 mm is increased,
   allowing a maximum 20% deviation of the dimensions of the immersed part of the vibrating plate means from the dimensions of the porous fiber structure electrode plaque immersed in the active compound such that the longitudinal dimension of the electrode plaque corresponds to 80% to 120% of the longitudinal dimension of the immersed part of the vibrating plate; and
   vibrating the active compound with said vibrating plate.

* * * * *